(12) United States Patent
Olds et al.

(10) Patent No.: US 8,879,191 B1
(45) Date of Patent: Nov. 4, 2014

(54) DISK DRIVE MODIFYING ROTATIONAL POSITION OPTIMIZATION ALGORITHM TO ACHIEVE TARGET PERFORMANCE FOR LIMITED STROKE

(71) Applicant: Western Digital Technologies, Inc., Irvine, CA (US)

(72) Inventors: Edwin S. Olds, Fort Collins, CO (US); Salman A. Nawaz, Trabuco Canyon, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 51 days.

(21) Appl. No.: 13/677,136

(22) Filed: Nov. 14, 2012

(51) Int. Cl.
G11B 5/55 (2006.01)
G11B 21/08 (2006.01)
G11B 27/19 (2006.01)

(52) U.S. Cl.
CPC .................................. G11B 21/083 (2013.01)
USPC ........................... 360/55; 360/78.04; 711/112

(58) Field of Classification Search
None
See application file for complete search history.

(56) References Cited

U.S. PATENT DOCUMENTS

| | | | |
|---|---|---|---|
| 5,371,888 A | 12/1994 | Lehnertz et al. | |
| 5,880,902 A | 3/1999 | Yu et al. | |
| 6,014,283 A | 1/2000 | Codilian et al. | |
| 6,052,076 A | 4/2000 | Patton, III et al. | |
| 6,052,250 A | 4/2000 | Golowka et al. | |
| 6,067,206 A | 5/2000 | Hull et al. | |
| 6,078,453 A | 6/2000 | Dziallo et al. | |
| 6,091,564 A | 7/2000 | Codilian et al. | |
| 6,094,020 A | 7/2000 | Goretzki et al. | |
| 6,101,065 A | 8/2000 | Alfred et al. | |
| 6,104,153 A | 8/2000 | Codilian et al. | |
| 6,122,133 A | 9/2000 | Nazarian et al. | |
| 6,122,135 A | 9/2000 | Stich | |
| 6,141,175 A | 10/2000 | Nazarian et al. | |
| 6,160,368 A | 12/2000 | Plutowski | |
| 6,181,502 B1 | 1/2001 | Hussein et al. | |
| 6,195,222 B1 | 2/2001 | Heminger et al. | |
| 6,198,584 B1 | 3/2001 | Codilian et al. | |
| 6,198,590 B1 | 3/2001 | Codilian et al. | |
| 6,204,988 B1 | 3/2001 | Codilian et al. | |
| 6,243,223 B1 | 6/2001 | Elliott et al. | |
| 6,281,652 B1 | 8/2001 | Ryan et al. | |
| 6,285,521 B1 | 9/2001 | Hussein | |
| 6,292,320 B1 | 9/2001 | Mason et al. | |
| 6,310,742 B1 | 10/2001 | Nazarian et al. | |
| 6,320,714 B1 | 11/2001 | Moon et al. | |
| 6,320,718 B1 | 11/2001 | Bouwkamp et al. | |
| 6,342,984 B1 | 1/2002 | Hussein et al. | |

(Continued)

OTHER PUBLICATIONS

U.S. Appl. No. 13/433,856 dated Mar. 29, 2012 22 pages.

*Primary Examiner* — Wayne Young
*Assistant Examiner* — James L Habermehl

(57) ABSTRACT

A disk drive is disclosed comprising a head actuated over a disk, wherein a maximum radial movement of the head is limited. A plurality of access commands are stored in a command queue, and an access latency is determined for each command in the command queue, wherein the access latency is based at least on a seek latency for the head and a rotational latency for the disk. The access latency for each access command is increased by an offset based at least on a seek length for each access command, wherein the offset compensates for the limited maximum radial movement of the head. An access command is selected from the command queue based on the increased access latencies, and the selected access command is executed.

18 Claims, 4 Drawing Sheets

(56) References Cited

U.S. PATENT DOCUMENTS

| | | | |
|---|---|---|---|
| 6,347,018 B1 | 2/2002 | Kadlec et al. |
| 6,369,972 B1 | 4/2002 | Codilian et al. |
| 6,369,974 B1 | 4/2002 | Asgari et al. |
| 6,373,649 B1 | 4/2002 | Walker et al. |
| 6,446,156 B1 | 9/2002 | Chia et al. |
| 6,462,896 B1 | 10/2002 | Codilian et al. |
| 6,476,996 B1 | 11/2002 | Ryan |
| 6,484,577 B1 | 11/2002 | Bennett |
| 6,493,169 B1 | 12/2002 | Ferris et al. |
| 6,496,324 B1 | 12/2002 | Golowka et al. |
| 6,498,698 B1 | 12/2002 | Golowka et al. |
| 6,499,022 B1 | 12/2002 | Dittmar et al. |
| 6,507,450 B1 | 1/2003 | Elliott |
| 6,534,936 B2 | 3/2003 | Messenger et al. |
| 6,538,839 B1 | 3/2003 | Ryan |
| 6,545,835 B1 | 4/2003 | Codilian et al. |
| 6,549,359 B1 | 4/2003 | Bennett et al. |
| 6,549,361 B1 | 4/2003 | Bennett et al. |
| 6,560,056 B1 | 5/2003 | Ryan |
| 6,568,268 B1 | 5/2003 | Bennett |
| 6,574,062 B1 | 6/2003 | Bennett et al. |
| 6,577,465 B1 | 6/2003 | Bennett et al. |
| 6,578,107 B1 * | 6/2003 | Anderson et al. | 711/113 |
| 6,614,615 B1 | 9/2003 | Ju et al. |
| 6,614,618 B1 | 9/2003 | Sheh et al. |
| 6,636,377 B1 | 10/2003 | Yu et al. |
| 6,690,536 B1 | 2/2004 | Ryan |
| 6,693,764 B1 | 2/2004 | Sheh et al. |
| 6,707,635 B1 | 3/2004 | Codilian et al. |
| 6,710,953 B1 | 3/2004 | Vallis et al. |
| 6,710,966 B1 | 3/2004 | Codilian et al. |
| 6,714,371 B1 | 3/2004 | Codilian |
| 6,714,372 B1 | 3/2004 | Codilian et al. |
| 6,724,564 B1 | 4/2004 | Codilian et al. |
| 6,731,450 B1 | 5/2004 | Codilian et al. |
| 6,735,041 B1 | 5/2004 | Codilian et al. |
| 6,738,220 B1 | 5/2004 | Codilian |
| 6,747,837 B1 | 6/2004 | Bennett |
| 6,754,036 B2 | 6/2004 | Dehnert |
| 6,760,186 B1 | 7/2004 | Codilian et al. |
| 6,788,483 B1 | 9/2004 | Ferris et al. |
| 6,791,785 B1 | 9/2004 | Messenger et al. |
| 6,795,268 B1 | 9/2004 | Ryan |
| 6,819,518 B1 | 11/2004 | Melkote et al. |
| 6,826,006 B1 | 11/2004 | Melkote et al. |
| 6,826,007 B1 | 11/2004 | Patton, III |
| 6,847,502 B1 | 1/2005 | Codilian |
| 6,850,383 B1 | 2/2005 | Bennett |
| 6,850,384 B1 | 2/2005 | Bennett |
| 6,867,944 B1 | 3/2005 | Ryan |
| 6,876,508 B1 | 4/2005 | Patton, III et al. |
| 6,882,496 B1 | 4/2005 | Codilian et al. |
| 6,885,514 B1 | 4/2005 | Codilian et al. |
| 6,894,863 B2 * | 5/2005 | Arakawa et al. | 360/78.04 |
| 6,900,958 B1 | 5/2005 | Yi et al. |
| 6,900,959 B1 | 5/2005 | Gardner et al. |
| 6,903,897 B1 | 6/2005 | Wang et al. |
| 6,914,740 B1 | 7/2005 | Tu et al. |
| 6,914,743 B1 | 7/2005 | Narayana et al. |
| 6,920,004 B1 | 7/2005 | Codilian et al. |
| 6,924,959 B1 | 8/2005 | Melkote et al. |
| 6,924,960 B1 | 8/2005 | Melkote et al. |
| 6,924,961 B1 | 8/2005 | Melkote et al. |
| 6,934,114 B1 | 8/2005 | Codilian et al. |
| 6,934,135 B1 | 8/2005 | Ryan |
| 6,937,420 B1 | 8/2005 | McNab et al. |
| 6,937,423 B1 | 8/2005 | Ngo et al. |
| 6,952,322 B1 | 10/2005 | Codilian et al. |
| 6,954,324 B1 | 10/2005 | Tu et al. |
| 6,958,881 B1 | 10/2005 | Codilian et al. |
| 6,963,465 B1 | 11/2005 | Melkote et al. |
| 6,965,488 B1 | 11/2005 | Bennett |
| 6,967,458 B1 | 11/2005 | Bennett et al. |
| 6,967,811 B1 | 11/2005 | Codilian et al. |
| 6,970,319 B1 | 11/2005 | Bennett et al. |
| 6,972,539 B1 | 12/2005 | Codilian et al. |
| 6,972,540 B1 | 12/2005 | Wang et al. |
| 6,972,922 B1 | 12/2005 | Subrahmanyam et al. |
| 6,975,480 B1 | 12/2005 | Codilian et al. |
| 6,977,789 B1 | 12/2005 | Cloke |
| 6,980,389 B1 | 12/2005 | Kupferman |
| 6,987,636 B1 | 1/2006 | Chue et al. |
| 6,987,639 B1 | 1/2006 | Yu |
| 6,989,954 B1 | 1/2006 | Lee et al. |
| 6,992,848 B1 | 1/2006 | Agarwal et al. |
| 6,992,851 B1 | 1/2006 | Cloke |
| 6,992,852 B1 | 1/2006 | Ying et al. |
| 6,995,941 B1 | 2/2006 | Miyamura et al. |
| 6,999,263 B1 | 2/2006 | Melkote et al. |
| 6,999,267 B1 | 2/2006 | Melkote et al. |
| 7,006,320 B1 | 2/2006 | Bennett et al. |
| 7,016,134 B1 | 3/2006 | Agarwal et al. |
| 7,023,637 B1 | 4/2006 | Kupferman |
| 7,023,640 B1 | 4/2006 | Codilian et al. |
| 7,027,256 B1 | 4/2006 | Subrahmanyam et al. |
| 7,027,257 B1 | 4/2006 | Kupferman |
| 7,035,026 B2 | 4/2006 | Codilian et al. |
| 7,043,567 B2 * | 5/2006 | Trantham | 711/113 |
| 7,046,472 B1 | 5/2006 | Melkote et al. |
| 7,050,249 B1 | 5/2006 | Chue et al. |
| 7,050,254 B1 | 5/2006 | Yu et al. |
| 7,050,258 B1 | 5/2006 | Codilian |
| 7,054,098 B1 | 5/2006 | Yu et al. |
| 7,061,714 B1 | 6/2006 | Yu |
| 7,064,918 B1 | 6/2006 | Codilian et al. |
| 7,068,451 B1 | 6/2006 | Wang et al. |
| 7,068,459 B1 | 6/2006 | Cloke et al. |
| 7,068,461 B1 | 6/2006 | Chue et al. |
| 7,068,463 B1 | 6/2006 | Ji et al. |
| 7,084,894 B2 | 8/2006 | Van Brocklin et al. |
| 7,088,547 B1 | 8/2006 | Wang et al. |
| 7,095,579 B1 | 8/2006 | Ryan et al. |
| 7,110,208 B1 | 9/2006 | Miyamura et al. |
| 7,110,214 B1 | 9/2006 | Tu et al. |
| 7,113,362 B1 | 9/2006 | Lee et al. |
| 7,113,365 B1 | 9/2006 | Ryan et al. |
| 7,116,505 B1 | 10/2006 | Kupferman |
| 7,126,781 B1 | 10/2006 | Bennett |
| 7,158,329 B1 | 1/2007 | Ryan |
| 7,180,703 B1 | 2/2007 | Subrahmanyam et al. |
| 7,184,230 B1 | 2/2007 | Chue et al. |
| 7,196,864 B1 | 3/2007 | Yi et al. |
| 7,199,966 B1 | 4/2007 | Tu et al. |
| 7,203,021 B1 | 4/2007 | Ryan et al. |
| 7,209,321 B1 | 4/2007 | Bennett |
| 7,212,364 B1 | 5/2007 | Lee |
| 7,212,374 B1 | 5/2007 | Wang et al |
| 7,215,504 B1 | 5/2007 | Bennett |
| 7,224,546 B1 | 5/2007 | Orakcilar et al. |
| 7,248,426 B1 | 7/2007 | Weerasooriya et al. |
| 7,251,098 B1 | 7/2007 | Wang et al. |
| 7,253,582 B1 | 8/2007 | Ding et al. |
| 7,253,989 B1 | 8/2007 | Lau et al. |
| 7,265,933 B1 | 9/2007 | Phan et al. |
| 7,289,288 B1 | 10/2007 | Tu |
| 7,298,574 B1 | 11/2007 | Melkote et al. |
| 7,301,717 B1 | 11/2007 | Lee et al. |
| 7,304,819 B1 | 12/2007 | Melkote et al. |
| 7,330,019 B1 | 2/2008 | Bennett et al. |
| 7,330,327 B1 | 2/2008 | Chue et al. |
| 7,333,280 B1 | 2/2008 | Lifchits et al. |
| 7,333,290 B1 | 2/2008 | Kupferman |
| 7,339,761 B1 | 3/2008 | Tu et al. |
| 7,365,932 B1 | 4/2008 | Bennett |
| 7,388,728 B1 | 6/2008 | Chen et al. |
| 7,391,583 B1 | 6/2008 | Sheh et al. |
| 7,391,584 B1 | 6/2008 | Sheh et al. |
| 7,433,143 B1 | 10/2008 | Ying et al. |
| 7,440,210 B1 | 10/2008 | Lee |
| 7,440,225 B1 | 10/2008 | Chen et al. |
| 7,450,334 B1 | 11/2008 | Wang et al. |
| 7,450,336 B1 | 11/2008 | Wang et al. |
| 7,453,661 B1 | 11/2008 | Jang et al. |
| 7,457,071 B1 | 11/2008 | Sheh |

(56) References Cited

U.S. PATENT DOCUMENTS

| | | |
|---|---|---|
| 7,466,509 B1 | 12/2008 | Chen et al. |
| 7,468,855 B1 | 12/2008 | Weerasooriya et al. |
| 7,471,486 B1 * | 12/2008 | Coker et al. ............... 360/78.06 |
| 7,477,471 B1 | 1/2009 | Nemshick et al. |
| 7,480,116 B1 | 1/2009 | Bennett |
| 7,489,464 B1 | 2/2009 | McNab et al. |
| 7,492,546 B1 | 2/2009 | Miyamura |
| 7,495,857 B1 | 2/2009 | Bennett |
| 7,499,236 B1 | 3/2009 | Lee et al. |
| 7,502,192 B1 | 3/2009 | Wang et al. |
| 7,502,195 B1 | 3/2009 | Wu et al. |
| 7,502,197 B1 | 3/2009 | Chue |
| 7,505,223 B1 | 3/2009 | McCornack |
| 7,542,225 B1 | 6/2009 | Ding et al. |
| 7,548,392 B1 | 6/2009 | Desai et al. |
| 7,551,390 B1 | 6/2009 | Wang et al. |
| 7,558,016 B1 | 7/2009 | Le et al. |
| 7,573,670 B1 | 8/2009 | Ryan et al. |
| 7,576,941 B1 | 8/2009 | Chen et al. |
| 7,580,212 B1 | 8/2009 | Li et al. |
| 7,583,470 B1 | 9/2009 | Chen et al. |
| 7,595,954 B1 | 9/2009 | Chen et al. |
| 7,602,575 B1 | 10/2009 | Lifchits et al. |
| 7,616,399 B1 | 11/2009 | Chen et al. |
| 7,619,844 B1 | 11/2009 | Bennett |
| 7,626,782 B1 | 12/2009 | Yu et al. |
| 7,630,162 B2 | 12/2009 | Zhao et al. |
| 7,639,447 B1 | 12/2009 | Yu et al. |
| 7,656,604 B1 | 2/2010 | Liang et al. |
| 7,656,607 B1 | 2/2010 | Bennett |
| 7,660,067 B1 | 2/2010 | Ji et al. |
| 7,663,835 B1 | 2/2010 | Yu et al. |
| 7,675,707 B1 | 3/2010 | Liu et al. |
| 7,679,854 B1 | 3/2010 | Narayana et al. |
| 7,688,534 B1 | 3/2010 | McCornack |
| 7,688,538 B1 | 3/2010 | Chen et al. |
| 7,688,539 B1 | 3/2010 | Bryant et al. |
| 7,697,233 B1 | 4/2010 | Bennett et al. |
| 7,701,661 B1 | 4/2010 | Bennett |
| 7,710,676 B1 | 5/2010 | Chue |
| 7,715,138 B1 | 5/2010 | Kupferman |
| 7,729,079 B1 | 6/2010 | Huber |
| 7,733,189 B1 | 6/2010 | Bennett |
| 7,746,592 B1 | 6/2010 | Liang et al. |
| 7,746,594 B1 | 6/2010 | Guo et al. |
| 7,746,595 B1 | 6/2010 | Guo et al. |
| 7,760,461 B1 | 7/2010 | Bennett |
| 7,800,853 B1 | 9/2010 | Guo et al. |
| 7,800,856 B1 | 9/2010 | Bennett et al. |
| 7,800,857 B1 | 9/2010 | Calaway et al. |
| 7,839,591 B1 | 11/2010 | Weerasooriya et al. |
| 7,839,595 B1 | 11/2010 | Chue et al. |
| 7,839,600 B1 | 11/2010 | Babinski et al. |
| 7,843,662 B1 | 11/2010 | Weerasooriya et al. |
| 7,852,588 B1 | 12/2010 | Ferris et al. |
| 7,852,592 B1 | 12/2010 | Liang et al. |
| 7,864,481 B1 | 1/2011 | Kon et al. |
| 7,864,482 B1 | 1/2011 | Babinski et al. |
| 7,869,155 B1 | 1/2011 | Wong |
| 7,876,522 B1 | 1/2011 | Calaway et al. |
| 7,876,523 B1 | 1/2011 | Panyavoravaj et al. |
| 7,916,415 B1 | 3/2011 | Chue |
| 7,916,416 B1 | 3/2011 | Guo et al. |
| 7,916,420 B1 | 3/2011 | McFadyen et al. |
| 7,916,422 B1 | 3/2011 | Guo et al. |
| 7,929,238 B1 | 4/2011 | Vasquez |
| 7,961,422 B1 | 6/2011 | Chen et al. |
| 8,000,053 B1 | 8/2011 | Anderson |
| 8,031,423 B1 | 10/2011 | Tsai et al. |
| 8,054,022 B1 | 11/2011 | Ryan et al. |
| 8,059,357 B1 | 11/2011 | Knigge et al. |
| 8,059,360 B1 | 11/2011 | Melkote et al. |
| 8,072,703 B1 | 12/2011 | Calaway et al. |
| 8,077,428 B1 | 12/2011 | Chen et al. |
| 8,078,901 B1 | 12/2011 | Meyer et al. |
| 8,081,395 B1 | 12/2011 | Ferris |
| 8,085,020 B1 | 12/2011 | Bennett |
| 8,116,023 B1 | 2/2012 | Kupferman |
| 8,145,934 B1 | 3/2012 | Ferris et al. |
| 8,179,626 B1 | 5/2012 | Ryan et al. |
| 8,189,286 B1 | 5/2012 | Chen et al. |
| 8,213,106 B1 | 7/2012 | Guo et al. |
| 8,254,222 B1 | 8/2012 | Tang |
| 8,300,348 B1 | 10/2012 | Liu et al. |
| 8,315,005 B1 | 11/2012 | Zou et al. |
| 8,320,069 B1 | 11/2012 | Knigge et al. |
| 8,351,174 B1 | 1/2013 | Gardner et al. |
| 8,358,114 B1 | 1/2013 | Ferris et al. |
| 8,358,145 B1 | 1/2013 | Ferris et al. |
| 8,364,992 B2 * | 1/2013 | Guthrie et al. ............... 711/112 |
| 8,390,367 B1 | 3/2013 | Bennett |
| 8,432,031 B1 | 4/2013 | Agness et al. |
| 8,432,629 B1 | 4/2013 | Rigney et al. |
| 8,451,697 B1 | 5/2013 | Rigney et al. |
| 8,482,873 B1 | 7/2013 | Chue et al. |
| 8,498,076 B1 | 7/2013 | Sheh et al. |
| 8,498,172 B1 | 7/2013 | Patton, III et al. |
| 8,508,881 B1 | 8/2013 | Babinski et al. |
| 8,531,798 B1 | 9/2013 | Xi et al. |
| 8,537,486 B2 | 9/2013 | Liang et al. |
| 8,542,455 B2 | 9/2013 | Huang et al. |
| 8,553,351 B1 | 10/2013 | Narayana et al. |
| 8,564,899 B2 | 10/2013 | Lou et al. |
| 8,576,506 B1 | 11/2013 | Wang et al. |
| 8,605,382 B1 | 12/2013 | Mallary et al. |
| 8,605,384 B1 | 12/2013 | Liu et al. |
| 8,610,391 B1 | 12/2013 | Yang et al. |
| 8,611,040 B1 | 12/2013 | Xi et al. |
| 8,619,385 B1 | 12/2013 | Guo et al. |
| 8,630,054 B2 | 1/2014 | Bennett et al. |
| 8,630,059 B1 | 1/2014 | Chen et al. |
| 8,634,154 B1 | 1/2014 | Rigney et al. |
| 8,634,283 B1 | 1/2014 | Rigney et al. |
| 8,643,976 B1 | 2/2014 | Wang et al. |
| 8,649,121 B1 | 2/2014 | Smith et al. |
| 8,654,466 B1 | 2/2014 | McFadyen |
| 8,654,467 B1 | 2/2014 | Wong et al. |
| 8,665,546 B1 | 3/2014 | Zhao et al. |
| 8,665,551 B1 | 3/2014 | Rigney et al. |
| 8,670,206 B1 | 3/2014 | Liang et al. |
| 8,687,312 B1 | 4/2014 | Liang |
| 8,693,123 B1 | 4/2014 | Guo et al. |
| 8,693,134 B1 | 4/2014 | Xi et al. |
| 8,699,173 B1 | 4/2014 | Kang et al. |
| 8,711,027 B1 | 4/2014 | Bennett |
| 8,717,696 B1 | 5/2014 | Ryan et al. |
| 8,717,699 B1 | 5/2014 | Ferris |
| 8,717,704 B1 | 5/2014 | Yu et al. |
| 8,724,245 B1 | 5/2014 | Smith et al. |
| 8,724,253 B1 | 5/2014 | Liang et al. |
| 8,724,524 B2 | 5/2014 | Urabe et al. |
| 8,737,008 B1 | 5/2014 | Watanabe et al. |
| 8,737,013 B2 | 5/2014 | Zhou et al. |
| 8,743,495 B1 | 6/2014 | Chen et al. |
| 8,743,503 B1 | 6/2014 | Tang et al. |
| 8,743,504 B1 | 6/2014 | Bryant et al. |
| 8,749,904 B1 | 6/2014 | Liang et al. |
| 2010/0035085 A1 | 2/2010 | Jung et al. |
| 2010/0037223 A1 * | 2/2010 | Yorimitsu ............... 718/100 |
| 2012/0042182 A1 * | 2/2012 | Fulkerson et al. ............ 713/320 |
| 2012/0284493 A1 | 11/2012 | Lou et al. |
| 2013/0120870 A1 | 5/2013 | Zhou et al. |
| 2013/0148240 A1 | 6/2013 | Ferris et al. |

* cited by examiner

DISK DRIVE MODIFYING ROTATIONAL POSITION OPTIMIZATION ALGORITHM TO ACHIEVE TARGET PERFORMANCE FOR LIMITED STROKE

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1A shows a prior art disk format comprising a number of servo sectors $6_0$-$6_N$ recorded around the circumference of the disk 2 that define a plurality of servo tracks 4, wherein data tracks are defined relative to the servo tracks (at the same or different radial density). Each servo sector $6_i$ may comprise a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a track address, used to position the head over a target data track during a seek operation. Each servo sector $6_i$ may further comprise groups of servo bursts 14 (e.g., A, B, C and D bursts), which comprise a number of consecutive transitions recorded at precise intervals and offsets with respect to a servo track centerline. The groups of servo bursts 14 provide fine head position information used for centerline tracking while accessing a data track during write/read operations.

Multiple access commands may be received from the host while the disk drive is executing a current access command. The access commands are typically buffered in a command queue, and when the disk drive is finished executing the current command, a next command is selected from the command queue according to a rotational position optimization (RPO) algorithm. The RPO algorithm attempts to select the next command that will minimize the mechanical latency in accessing the disk, including the seek time required to move the head to the target track and the rotational time for the head to reach the target data sector.

The seek time is typically estimated for a given seek length (the number of tracks the head must traverse to arrive at the target track), where the seek time is typically related to the performance capabilities of the VCM as well as the parameters selected for the servo system to perform the seek, such as the selected velocity trajectory. Since the performance capability of the VCM is typically not a linear function of seek distance, and since the servo parameters may change based on the seek distance, the relationship between the seek length and seek time is also typically not linear across the radius of the disk. This is illustrated in FIG. 1B which shows a seek profile giving the seek time as a function of seek length. In this example, the seek profile is divided into a number of seek length segments, where each seek length segment may correspond to adjusting a servo system parameter, such as adjusting the velocity trajectory. Each seek length segment may correspond to a single seek time estimate, or each seek length segment may correspond to a function (e.g., a linear function) which may provide a more accurate estimate of the seek time relative to the seek length.

DETAILED DESCRIPTION

Figure 2A:
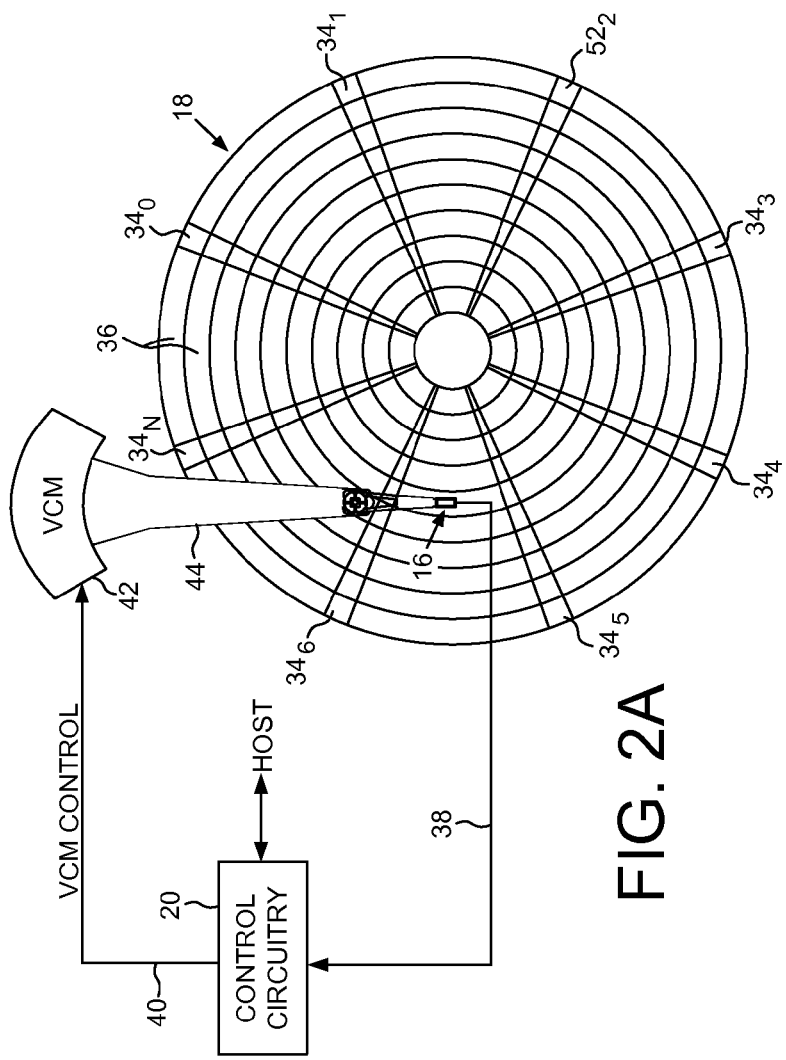
FIG. 2A shows a disk drive according to an embodiment of the present invention comprising a head actuated over a disk.
Figure 2B:
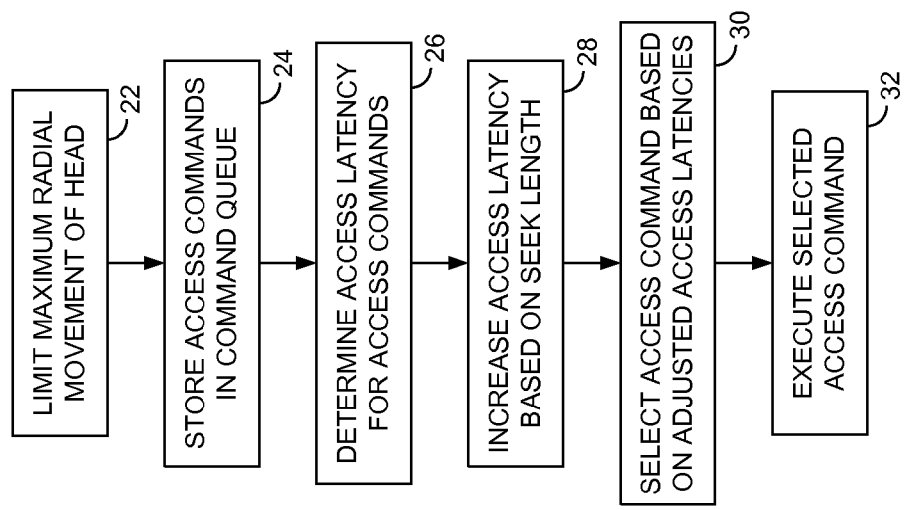
FIG. 2B is a flow diagram according to an embodiment of the present invention wherein when operating the disk drive with a limited stroke, an access latency is increased prior to executing a rotational position optimization (RPO) algorithm in order to substantially match the operating performance in terms of average throughput to a full stroke disk drive.

FIG. 2A shows a disk drive according to an embodiment of the present invention comprising a head 16 actuated over a disk 18. The disk drive further comprises control circuitry 20 operable to execute the flow diagram of FIG. 2B, wherein a maximum radial movement of the head is limited (block 22). A plurality of access commands are stored in a command queue (block 24), and an access latency is determined for each command in the command queue (block 26), wherein the access latency is based at least on a seek latency for the head and a rotational latency for the disk. The access latency for each access command is increased by an offset based at least on a seek length for each access command (block 28), wherein the offset compensates for the limited maximum radial movement of the head. An access command is selected from the command queue based on the increased access latencies (block 30), and the selected access command is executed (block 32).

Figure 1A:
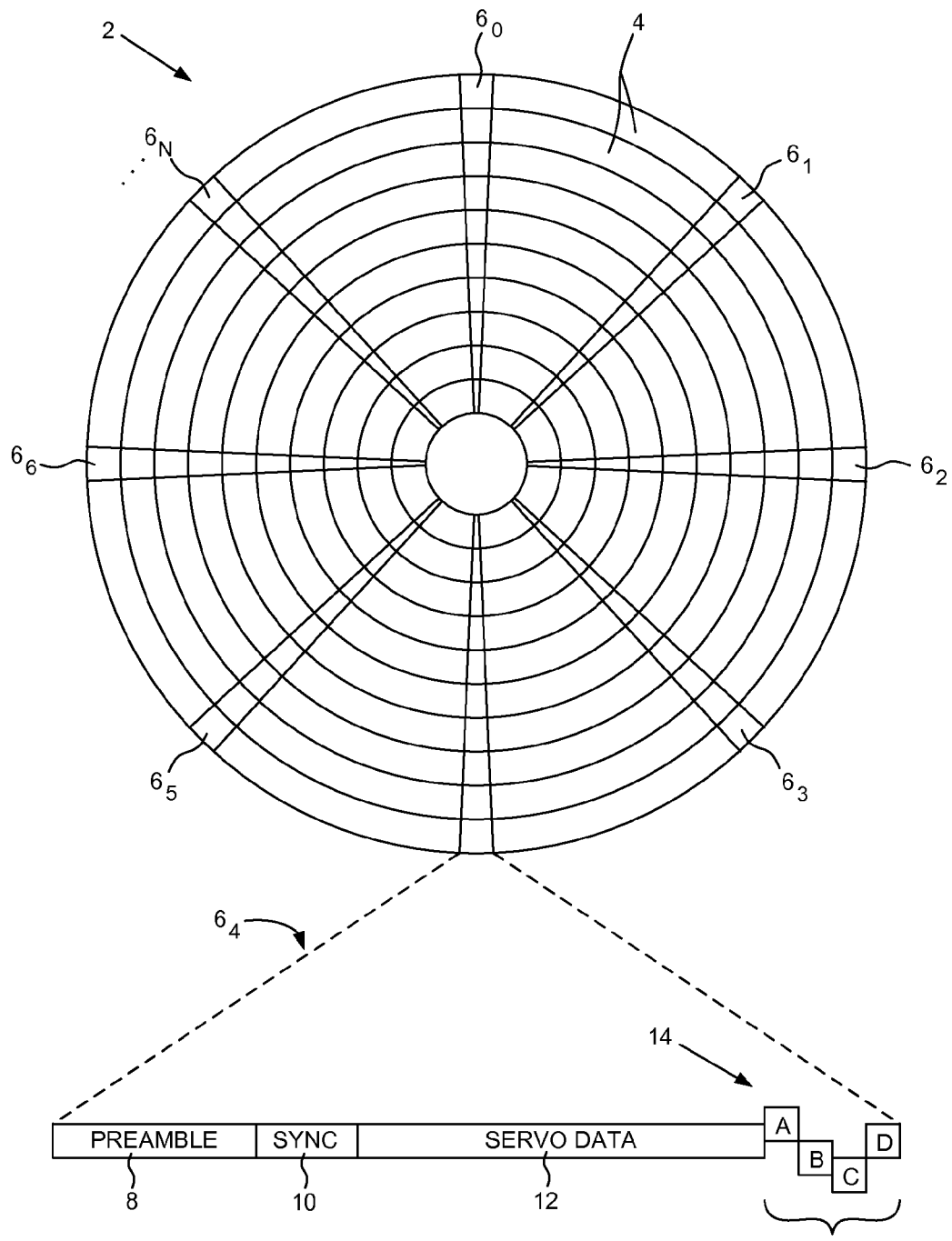
FIG. 1A shows a prior art disk format comprising a plurality of tracks defined by servo sectors.
Figure 1B:
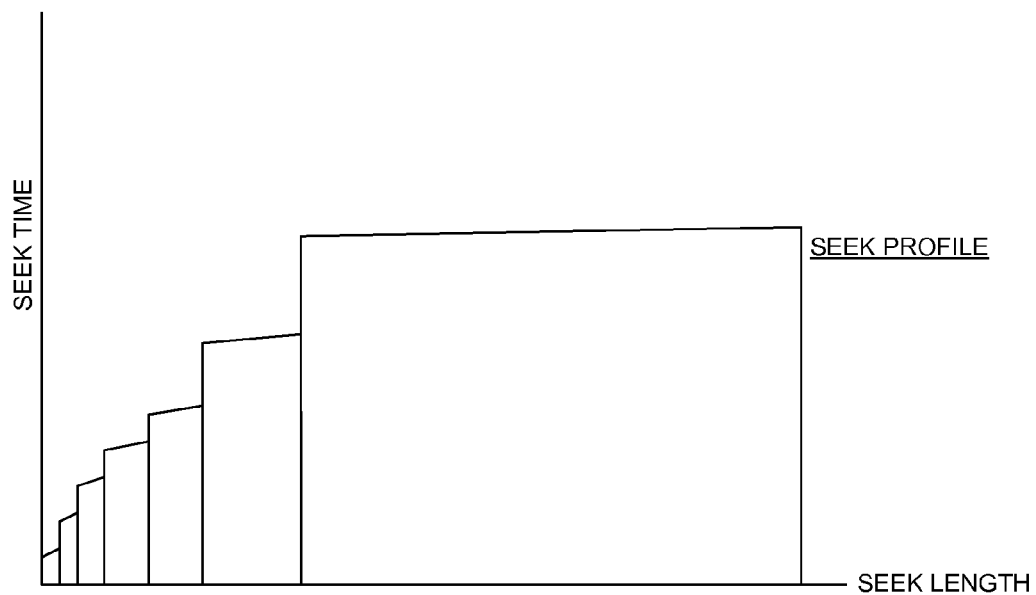
FIG. 1B shows a prior art seek profile giving seek time as a function of seek length for a full stroke disk drive.

In the embodiment of FIG. 2A, the disk 18 comprises embedded servo sectors $34_0$-$34_N$ that define a plurality of servo tracks 36, wherein a plurality of data tracks are defined relative to the servo tracks (at the same or different radial density). The control circuitry 20 processes a read signal 38 emanating from the head 16 to demodulate the servo sectors $34_0$-$34_N$ and generate a position error signal (PES) representing an error between the actual position of the head and a target position relative to a target track. The control circuitry 20 filters the PES using a suitable compensation filter to generate a control signal 40 applied to a voice coil motor (VCM) 42 which rotates an actuator arm 44 about a pivot in order to actuate the head 16 radially over the disk in a direction that reduces the PES. The servo sectors $34_0$-$34_N$ may comprise any suitable position information, such as a track address for coarse positioning and servo bursts for fine positioning. The servo bursts may comprise any suitable servo burst pattern, such as an amplitude based servo burst pattern (A, B, C, D quadrature pattern) shown in FIG. 1A, or a phase based servo burst pattern (N, Q servo bursts).

In one embodiment, the capacity of the disk drive is reduced by limiting the maximum stroke of the actuator arm 44, thereby limiting the maximum radial movement of the head 16 over the disk 18. That is, the data tracks defined outside of the maximum radial movement of the head 16 are not accessed, thereby reducing the capacity of the disk drive.

The maximum radial movement of the head may be limited in any suitable manner, such as by defining an inaccessible band of data tracks at the outer diameter of the disk 18, or at the inner diameter of the disk 18, or both. Limiting the maximum radial movement of the head also limits the maximum seek length, which increases the performance relative to a full stroke disk drive.

In one embodiment, it may be desirable for a limited stroke disk drive to exhibit performance similar to a full stroke disk drive. In this manner a disk drive manufacturer may offer disk drives of varying capacity having similar performance characteristics in terms of throughput. In one embodiment, the performance of a limited stroke disk drive is reduced relative to a full stroke disk drive by adding access latency to each access command prior to executing the RPO algorithm.

An RPO algorithm selects a next access command from the command queue to execute based on an access latency determined from a seek latency for the head to reach a target data track and a rotational latency for the disk to rotate to the target data sector. Increasing the access latency for each access command in the command queue reduces the performance of a limited stroke disk drive by changing the execution order of the access commands as determined by the RPO algorithm.

The access latency for each access command in the command queue may be increased in any suitable manner. In one embodiment, the access latency is increased without increasing either the seek latency of the head or the rotational latency of the disk. That is, the access latency is increased only with respect to the RPO algorithm, whereas the actual access latency remains the same since the seek and rotational latencies are unchanged. When the RPO algorithm processes the virtually increased access latencies, the order of execution changes which detunes the performance, even though the potential performance remains higher.

In an alternative embodiment, the access latency may be increased by increasing at least one of the seek latency of the head and the rotational latency of the disk. For example, the seek latency of the head may be increased by modifying a seek profile, such as by decreasing one or more of an acceleration trajectory, a constant velocity phase trajectory, or a deceleration phase trajectory. In addition (or alternatively), the rotational latency can be increased by decreasing the spin rate of the disk. Accordingly in this embodiment the actual access latency is increased for each access command in the command queue such that the order of access commands selected by the RPO algorithm is truly optimal. The execution order of the access commands as determined by the RPO algorithm will be the same regardless as to whether the access latency is increased virtually or actually.

Figure 3A:
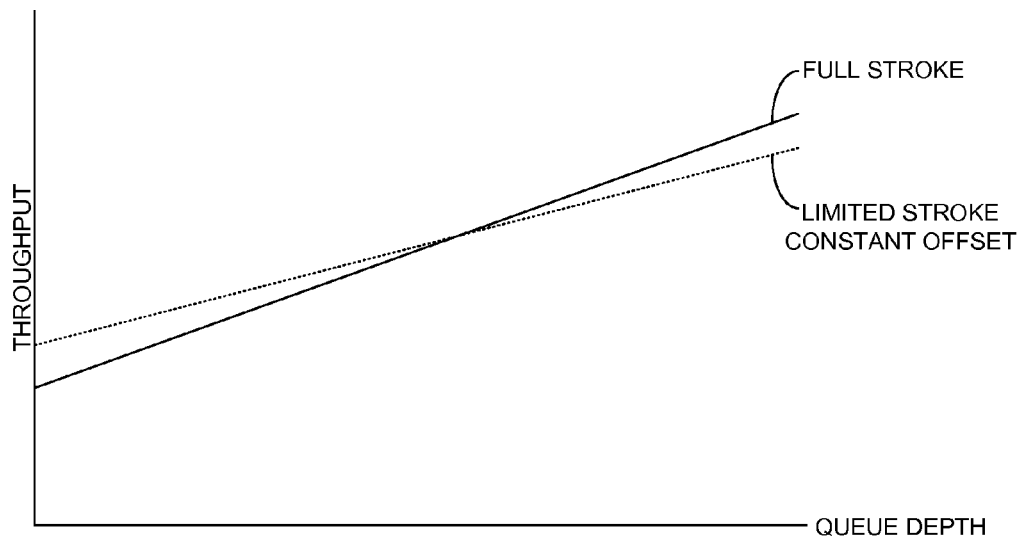
FIG. 3A illustrates how increasing the access latency for each access command of the RPO algorithm based on a constant offset may not sufficiently match the average throughput of a limited stroke disk drive to a full stroke disk drive across all command queue depths.

FIG. 3A is a graph according to an embodiment of the present invention which plots the average throughput of a disk drive relative to a queue depth of the command queue. As the queue depth increases, the average seek length of the access commands selected from the command queue decreases since there are more access commands to select from. Conversely the average seek length increases as the queue depth decreases since there are fewer access commands to select from. Accordingly, the average throughput of a disk drive increases proportionally with the queue depth as illustrated in FIG. 3A. If the performance of a limited stroke disk drive is decreased by adding a constant offset to the access latency for each access command, the throughput versus queue depth will be higher at lower queue depths and lower at higher queue depths as illustrated in FIG. 3A. If the average queue depth remains near the middle of the graph where the two plots intersect, then the performance of a limited stroke disk drive will substantially match the performance of a full stroke disk drive. However, if the queue depth deviates from the middle of the graph, the resulting performance of a limited stroke drive will differ (either higher or lower) from a full stroke disk drive.

Figure 3B:
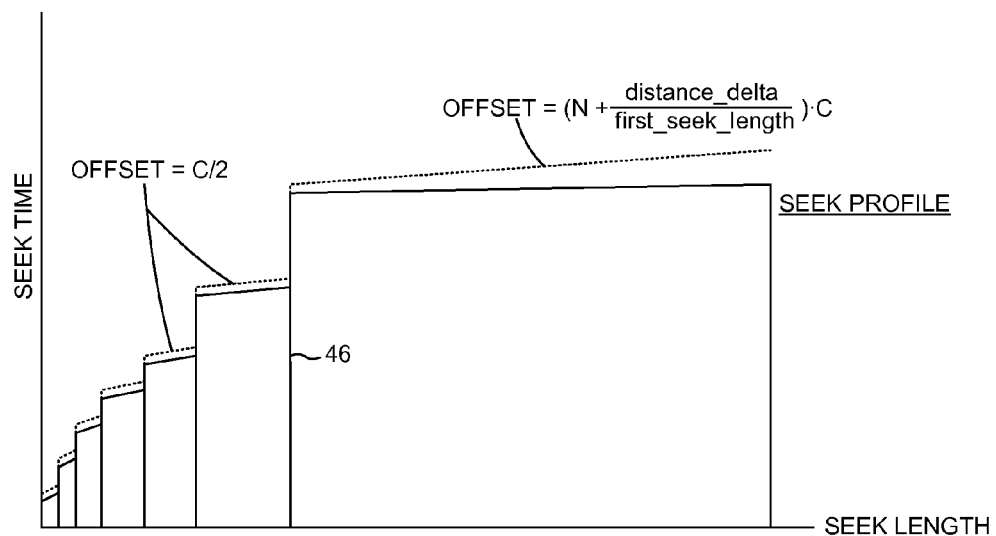
FIG. 3B illustrates an embodiment of the present invention wherein increasing the access latency for the RPO algorithm based on an offset computed as a non-linear function of the seek length for each access command may better match the average throughput of a limited stroke disk drive to a full stroke disk drive across all command queue depths.

In one embodiment, the access latency of each access command is increased by adding an offset that is computed as a non-linear function of the seek length for each access command so that the two plots shown in FIG. 3A will substantially align across all queue depths. FIG. 3B illustrates an example of this embodiment wherein a predetermined offset (e.g., C/2) is used to increase the access latency of each command for a number of seek lengths up to a first seek length 46, and the offset is computed for a number of seek lengths exceeding the first seek length 46. In the embodiment shown in FIG. 3B, the offset for the number of seek lengths exceeding the first seek length 46 is computed according to:

$$\left(N + \frac{\text{distance\_delta}}{\text{first\_seek\_length}}\right) \cdot C$$

where N is a value that defines a minimum for the offset, distance_delta represents the difference between the seek length of an access command and the first seek length 46, and C is a scalar. Adding a fraction of C (e.g., C/2) as the offset for the seek latencies up to the first seek length 46, and then adding an offset computed using the above equation causes the two plots shown in FIG. 3A to substantially align (i.e., the limited stroke plot will substantially align to the full stroke plot) across all queue depths, and therefore the performance of a limited stroke disk drive will substantially match the performance of a full stroke disk drive across all queue depths.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk;
   a head actuated over the disk; and
   control circuitry operable to:
   limit a maximum radial movement of the head;

store a plurality of access commands in a command queue;

determine an access latency for each command in the command queue, wherein the access latency is based at least on a seek latency for the head and a rotational latency for the disk;

increase the access latency for each access command by an offset based at least on a seek length for each access command, wherein the offset compensates for the limited maximum radial movement of the head;

select an access command from the command queue based on the increased access latencies; and execute the selected access command.

2. The disk drive as recited in claim 1, wherein the control circuitry is operable to increase the access latency without increasing the seek latency for the head and the rotational latency for the disk.

3. The disk drive as recited in claim 1, wherein the control circuitry is operable to increase the access latency by increasing at least one of the seek latency for the head and the rotational latency for the disk.

4. The disk drive as recited in claim 1, wherein the control circuitry is operable to increase the access latency in order to substantially maintain a target throughput of access commands.

5. The disk drive as recited in claim 4, wherein the target throughput of access commands corresponds to a throughput of access commands without limiting the maximum radial movement of the head.

6. The disk drive as recited in claim 4, wherein the control circuitry is further operable to:

predetermine the offset for a number of seek lengths up to a first seek length; and compute the offset for a number of seek lengths exceeding the first seek length.

7. The disk drive as recited in claim 6, wherein when the seek length of a first access command exceeds the first seek length the control circuitry is further operable to compute the offset for the first access command based on a difference between the seek length of the first access command and the first seek length.

8. The disk drive as recited in claim 7, wherein the control circuitry is further operable to compute the offset according to:

$$\left(N + \frac{distance\_delta}{first\_seek\_length}\right) \cdot C$$

where:

N is a value that defines a minimum for the offset;

distance_delta represents the difference between the seek length of the first access command and the first seek length; and C is a scalar.

9. The disk drive as recited in claim 8, wherein the predetermined offset comprises a fraction of C.

10. A method of operating disk drive, the disk drive comprising a head actuated over a disk, the method comprising:

limiting a maximum radial movement of the head;

storing a plurality of access commands in a command queue;

determining an access latency for each command in the command queue, wherein the access latency is based at least on a seek latency for the head and a rotational latency for the disk;

increasing the access latency for each access command by an offset based at least on a seek length for each access command, wherein the offset compensates for the limited maximum radial movement of the head;

selecting an access command from the command queue based on the increased access latencies; and executing the selected access command.

11. The method as recited in claim 10, wherein the access latency is increased without increasing the seek latency for the head and the rotational latency for the disk.

12. The method as recited in claim 10, wherein the access latency is increased by increasing at least one of the seek latency for the head and the rotational latency for the disk.

13. The method as recited in claim 10, further comprising increasing the access latency in order to substantially maintain a target throughput of access commands.

14. The method as recited in claim 13, wherein the target throughput of access commands corresponds to a throughput of access commands without limiting the maximum radial movement of the head.

15. The method as recited in claim 13, wherein the method further comprises:

predetermining the offset for a number of seek lengths up to a first seek length; and computing the offset for a number of seek lengths exceeding the first seek length.

16. The method as recited in claim 15, wherein when the seek length of a first access command exceeds the first seek length the method further comprises computing the offset for the first access command based on a difference between the seek length of the first access command and the first seek length.

17. The method as recited in claim 16, wherein the offset is computed according to:

$$\left(N + \frac{distance\_delta}{first\_seek\_length}\right) \cdot C$$

where:

N is a value that defines a minimum for the offset;

distance_delta represents the difference between the seek length of the first access command and the first seek length; and C is a scalar.

18. The method as recited in claim 17, wherein the predetermined offset comprises a fraction of C.

* * * * *